Dec. 27, 1938.   R. F. HAGGERTY   2,141,183
SPOTTING BOARD
Filed March 5, 1937   4 Sheets-Sheet 1
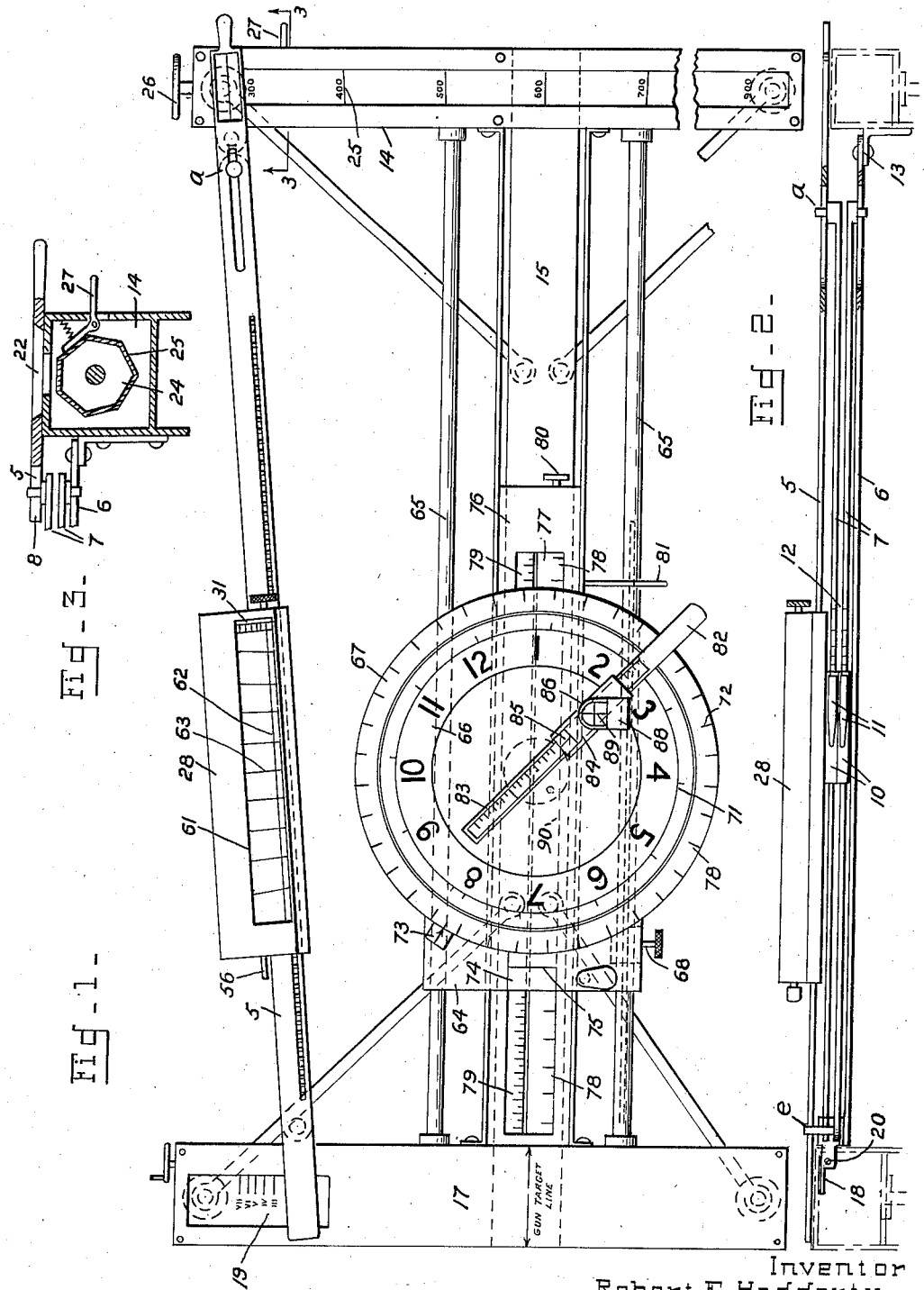
Inventor
Robert F. Haggerty
By W. N. Roach
Attorney

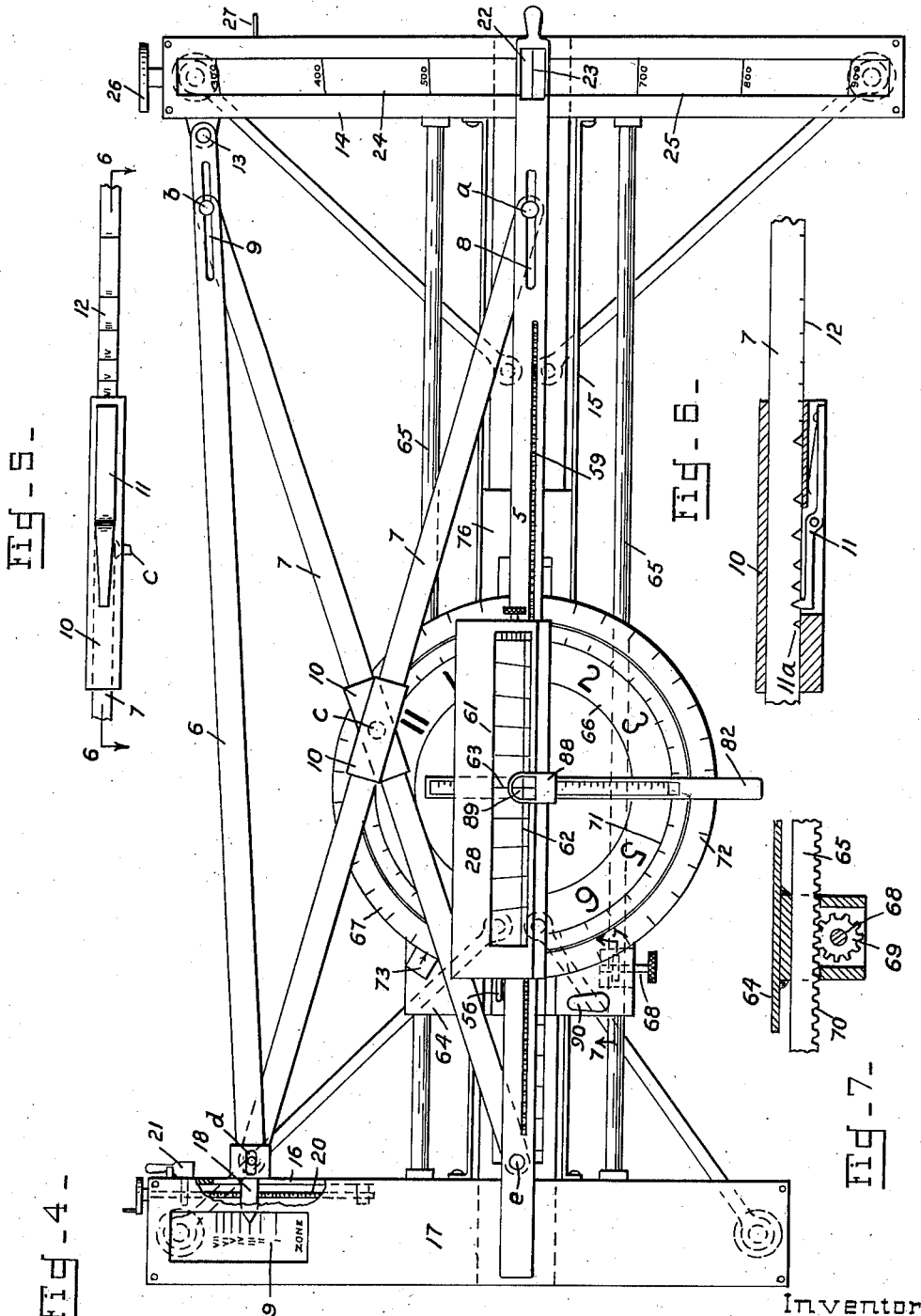

Dec. 27, 1938.   R. F. HAGGERTY   2,141,183
SPOTTING BOARD
Filed March 5, 1937   4 Sheets—Sheet 3
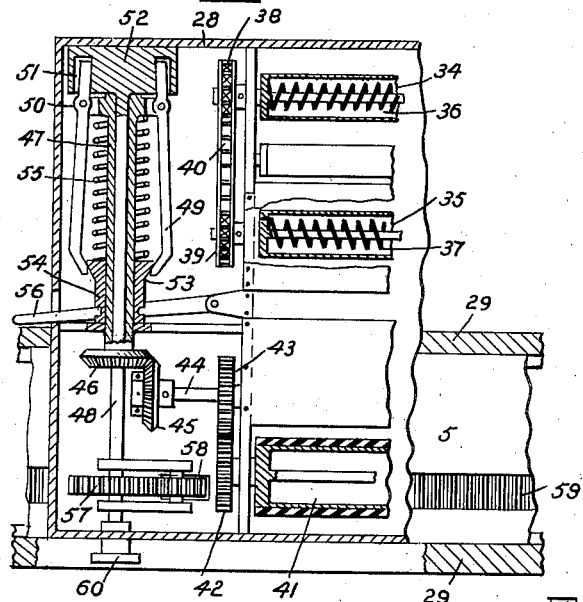
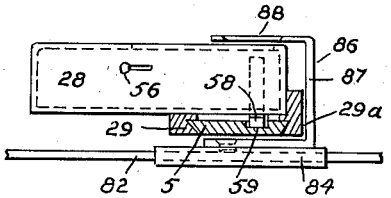
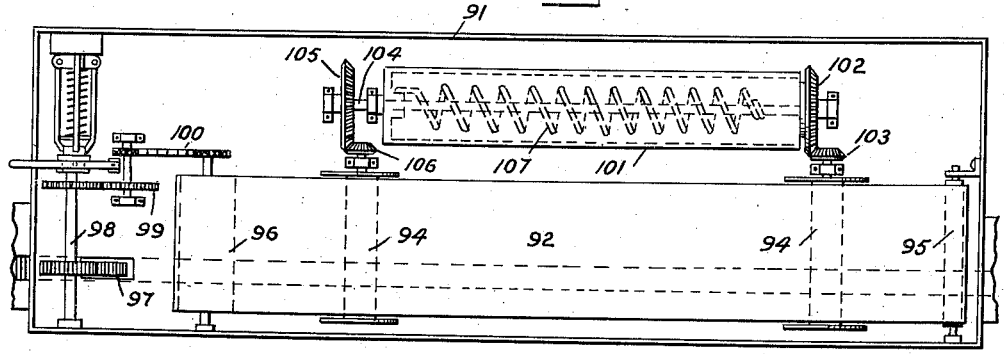
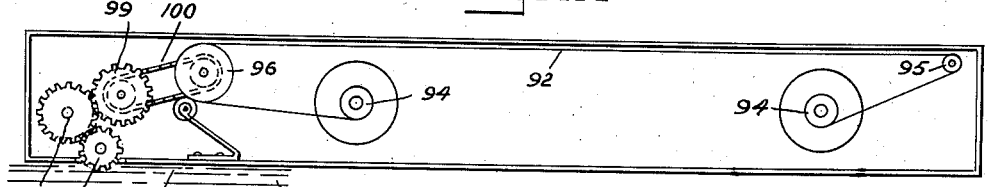
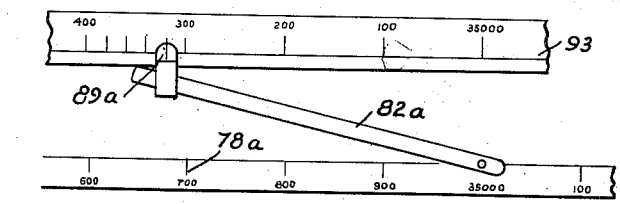
Inventor
Robert F. Haggerty
By W. N. Roach
Attorney Dec. 27, 1938.   R. F. HAGGERTY   2,141,183
SPOTTING BOARD
Filed March 5, 1937   4 Sheets-Sheet 4
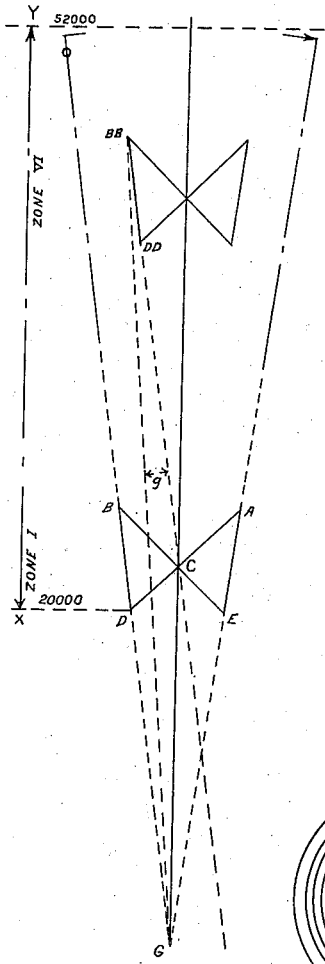
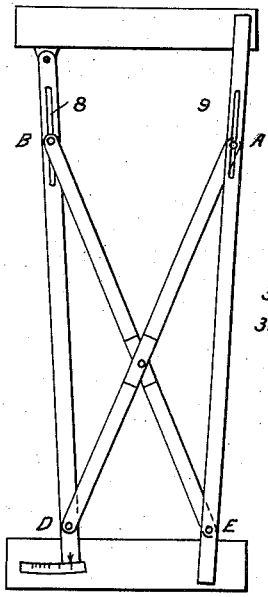
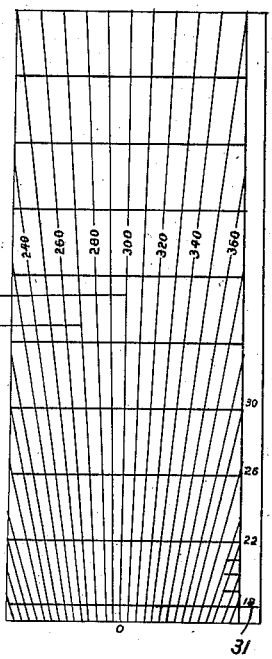
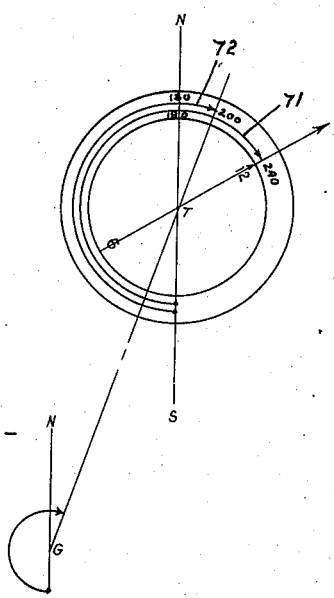
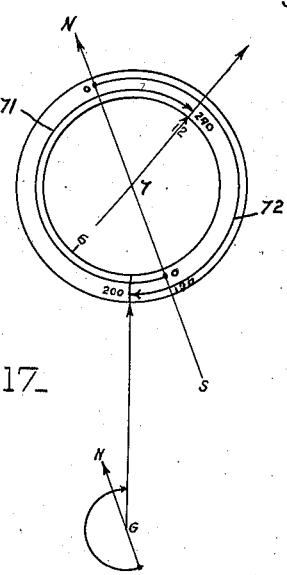
Inventor
Robert F. Haggerty
By W. N. Roach
Attorney Patented Dec. 27, 1938

2,141,183

UNITED STATES PATENT OFFICE 2,141,183

SPOTTING BOARD

Robert F. Haggerty, United States Army, Watertown, Mass.

Application March 5, 1937, Serial No. 129,224

15 Claims. (Cl. 33—75)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a spotting board.

In gunnery for artillery spotting is the process of determining deviations or sensings for use in adjustment of fire. In calculating fire data corrections must be made for non-standard conditions but it is impossible to always determine those conditions and their effects with sufficient accuracy to place the center of dispersion of the guns on the target. Therefore recourse is had to observation of fire, or spotting, for determining the location of the impacts of single shots or the centers of impact of groups of shots, with respect to the target. From this data adjustment corrections are determined which will move the centers of impact closer to the target.

It is sometimes impossible to conduct observation from terrestrial stations due to extreme range and curvature of the earth, poor conditions of visibility, or smoke screens which mask the target. As a result the airplane is used to enable an observer to obtain data from a position in the vicinity of the target.

The purpose of this invention is to provide a spotting board on which the data obtained by an aerial observer, that is, the designation of the burst point or splash in terms of reference to the target, may be rapidly and accurately applied to ascertain deflection and percentage range corrections that are required in relaying the gun.

The spotting board is characterized by an arrangement which enables the field of fire to be represented on an extremely large scale and which utilizes the entire length of the board for each one of a large number of portions or zones of the field of fire. This is accomplished by adjusting lazy tongs which carry the reading or gun arm whereby the gun arm describes an arc about a center off of the board, which arc is appropriate for each of the different zones into which the field of fire is divided.

The spotting board also includes a novel method of orienting a spotting dial, and a novel arrangement for determining percentage range corrections or corrected range from a chart whose range position on the gun arm is conveniently checked by reference to the spotting dial and whose range reading is automatically established by its displacement on the gun arm.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a plan view of the improved spotting board with the gun arm out of reading position.

Fig. 2 is a view in side elevation of the arm group.

Fig. 3 is a detail sectional view generally on the line 3—3 of Fig. 1;

Fig. 4 is a plan view of the spotting board with the gun arm in reading position;

Fig. 5 is a detail view in side elevation of the central portion of one of the toggle arms;

Fig. 6 is a sectional view on the line 6—6 of Fig. 5;

Fig. 7 is a sectional view on the line 7—7 of Fig. 1;

Fig. 8 is a transverse sectional view of a portion of the percentage corrector casing on the gun arm;

Fig. 9 is a view showing the gun arm in reading position against the targ;

Fig. 10 is a plan view of a modified range corrector casing for the gun arm;

Fig. 11 is a view in side elevation of the interior of the casing of Fig. 10;

Fig. 12 is a schematic view showing the relation of the range corrector scale to the spotting arm;

Fig. 13 is a diagram illustrating the principle of the spotting board;

Fig. 14 is a mechanical representation of a portion of the diagram of Fig. 13;

Fig. 15 is a detail view of the chart for the percentage corrector;

Figs. 16 and 17 are diagrams illustrating the principle of orientation used in connection with the spotting board.

Referring to Fig. 13, G represents the gun position and GC the gun target line. The field of fire in which a distant target is located is outlined for illustration between lines X and Y respectively representing ranges of 20,000 and 52,000 yards from G and between radial lines GA and GB on opposite sides of the line GC. A projectile fired from G at a target C on the line GC may strike at a point which is to the right or left of the target or short or over with respect to the target. In order to correct for the errors, the gun at G must be relayed and the corrections are determined by a spotting board in terms of range and deflection based on the position of the "splash" with respect to the target.

If the field of fire between X and Y be physically represented on a spotting board on a large scale, for example 200 yards to the inch, it will be noted by reference to Fig. 1 that the spotting board would have a length of about fourteen feet. If the gun position G is also to be represented on the spotting board an additional length in excess of eight feet would be required. In an arrangement of this character the line GA may be used to illustrate the gun arm of a spotting board and would be movable about the point G.

In the present invention it is proposed to divide the field of fire into zones which correspond to arbitrary portions of the total range between X and Y, and to provide a spotting board which when adjusted will meet the conditions for any zone. The total range to be covered is divided into successive zones of 6,000 yards each with 1,000 yards overlap above and below, i. e., 6,000 yards being the basic range per zone, the zones cover from 20,000 to 26,000, 25,000 to 31,000, 30,000 to 36,000, etc. Zones I and VI are shown in Fig. 13, zone I consisting of the area within the points A, B, D, E, and the points A, B and the points D, E being equal distances from the point G and from the line GC.

If we connect these points by lines BD, BE and AD, AE we have a figure overlying zone I which may be represented mechanically by the structure shown in Fig. 14 in which BD is a fixed director arm, AE is a movable gun arm, and BE and AD are lazy tongs connecting the arms. The gun arm AE may be moved, pantograph fashion, towards and away from the fixed arm BD and it will move about G as a center. This structure as shown in Fig. 4 may be utilized in a spotting board for zone I but by reference to Fig. 1 it is seen that it cannot be used, unchanged, for zone VI because the fixed arm BB—DD is not centered about the point G. However if we swing this arm through the angle $g$ so that if continued it would intersect G and change the location of the pivot C then we have adjusted the structure of Fig. 4 to meet the conditions for zone VI. The same character of adjustment pertains to the remainder of the zones.

The gun arm, director arm, and lazy tong assembly is therefore capable of being adjusted to the condition obtaining for the seven successive zones of the field of fire and operated throughout its length for each of the zones. This is of significance because it enables the length of the gun arm assembly to be considerably reduced or alternatively it permits the use of a large scale, for example 200 yards to the inch. As a result of this arrangement the gun arm assembly of this spotting board is about five feet in length, yet it is on a scale of 200 yards to the inch.

Referring to Figs. 1 to 12 in which the foregoing principles are embodied in a spotting board, there is shown a gun arm 5 and a director arm 6 connected by lazy tong arms 7—7, the connections being effected by pivot pins $a$, $e$ and $b$, $d$, the pins $a$ and $b$ being disposed in slots 8 and 9 respectively formed in the gun arm 5 and director arm 6. Each of the arms 7 slidably carries a sleeve 10 (Figs. 2, 5 and 6) which may be held immovable on the arm by a latch 11. The two sleeves 10 are connected by a pivot pin $c$. A graduated scale 12, numbered from I to VII and representing zones, as previously explained, is provided on one or both of the arms and may be conveniently read against the end of the sleeve. Since the positions of the lazy tong pivots are predetermined, and in order to facilitate speed of operation and prevent errors in setting, permanent notches 11a (Fig. 6) are cut in the lazy tong arms into which the self-centering latches 11 will drop, thus positioning the slide with accuracy. The scale 12 indicates the zone corresponding to the notches in which the slide latches are set at any time.

The end of the director arm 6 that is provided with the slot 9 is mounted on a pivot pin 13 which is carried by the left end of a front casing 14 forming an element of a frame 15. The other end of the director arm is slidably mounted in a slot 16 in a rear casing 17 which forms another element of the frame and it includes an index 18 readable against a graduated scale 19 that is carried within the casing and is numbered from I to VII. The slidable end of the director arm is mounted on and movable by a screw shaft 20 which is held against rotation by a latch 21.

Referring now to Fig. 4, the gun arm 5 rests on the upper faces of the casing 14 and is slidable thereon. The end of the gun arm that rides on the casing 14 has a transparent window 22 provided with a reference mark 23. A heptagonal ruler 24 (Fig. 3) in the casing 14 is provided with seven deflection scales 25, applicable to the seven zones, and graduated in values of degrees of azimuth with a reference number of 600 as normal and corresponding to the line GC, that is the line from gun to target. An externally positioned handwheel 26 is provided for turning the ruler, and a latch 27 serves to hold the ruler against rotation.

A casing 28 (Fig. 1) is mounted to move along the upper face of the gun arm 5 and is held thereon by guides 29—29 (Fig. 8), the guide 29 being accurately machined to furnish a fiducial edge. A sheet 30 (Fig. 15) of tracing cloth or appropriate material, within the casing 28 bears a chart comprising appropriately marked range lines 31 representing the total range XY at the same scale, 200 yards to the inch, and also a set of appropriately marked and spaced diverging lines 32 drawn through points of equal percent on opposite sides of a central zero line 33, marked with the reference number 300 as normal, so that the distances between the diverging lines indicate true percentages of range for the range lines 31.

The sheet 30 is mounted on a set of take-up rollers 34—35 (Fig. 8) having oppositely acting coil springs respectively numbered 36—37 which normally tend to maintain the sheet in a taut condition. Sprockets 38 and 39 respectively mounted on corresponding ends of the rollers 34 and 35 are connected by a chain 40. Any difference in the diameter of the two rollers due to unequal amounts of the chart being rolled on them will be compensated for by the springs which will maintain an equal tension due to the sprocket chain connection. The sprocket chain moves in the direction of rolling of the sheet 30.

The sheet is driven in opposite directions by a driving roller 41 having a rubber platen. The chart is pressed against the roller by rubber feed rollers (not shown) in a manner commonly employed in typewriters. A spur gear 42 on one end of the driving roller meshes with a spur gear 43 on a shaft 44 carrying a bevel gear 45. The bevel gear 45 meshes with a bevel gear 46 on a sleeve 47 that is loosely mounted on a drive shaft 48. The sleeve 47 is clutched to the drive shaft 48 by means of levers 49 pivotally carried by a yoke 50 on the sleeve and having their corresponding ends inserted in an annular groove 51 in the head 52 of the drive shaft. The levers are adapted to grip the head when their opposite tapered ends are moved outwardly by the cone 53 of a collar 54. A spring 55 encircling the sleeve 47 is seated on the yoke 50 and acts on the collar 54 to normally maintain the levers 49 in driving engagement with the head of the drive shaft. The collar 54 is moved out of engagement with the levers 49 by an operating member 56 which also serves by engagement with the casing 28, to limit movement of the collar 54.

A spur gear 57 on the drive shaft 48 meshes with an idler spur gear 58 which projects through the bottom of the casing 28 and meshes with a rack 59 on the gun arm 5. The drive shaft is also provided with a handwheel 60 whereby it may be manually actuated. When the casing 28 is moved along the gun arm with the clutch engaged, the driving roller 41 is actuated by the train of gears and its circumference moves through a distance equal to the linear displacement of the casing, and the sheet 30 bearing the chart is similarly displaced.

A window 61 in the top of the casing 28 exposes to view a portion of the chart. A reference line 62 is provided on the window exactly over the center line (or line of pivots) of the gun arm. A second reference line 63 perpendicular to the line 62 is provided on the window directly over the zero line 33 of the chart.

Inasmuch as the gun arm assembly is to be used over the entire length of the board of each of seven zones it is necessary to employ the chart mechanism in a similar manner. Consequently, when the clutch is engaged, movement of the casing 28 over the entire length of the gun arm will displace the chart over a range of 6000 yards. In shifting from one zone to another, the clutch is disengaged and the casing 28 moved rearwardly to the casing 17 of the frame. The manner of setting the range position of the casing 28 and the range reading of the chart will be described hereinafter.

A carriage 64 slidably mounted on a pair of rods 65—65 between the casings 14 and 17 carries a rotatably mounted clock dial 66 and a rotatably mounted ring 67 encircling the dial. A shaft 68 on the carriage 64 has a gear 69 (Fig. 7) which engages a rack 70 on the under side of one of the rods 65. The inner and outer margins of the ring are provided with azimuth scales of 360 degrees respectively 71 and 72. The inner scale 71 establishes a reference for orienting the dial whose center represents a ship target with its bow pointing at 12 o'clock so that the line from 6 to 12 o'clock represents the course of the target. The inner and outer scales would normally be zeroed 180° apart but a further offset of 30° is made in the outer scale to permit the index 73 to be located at a more convenient place on the carriage 64. This has no bearing on the theory of orientation which will be described later. The outer scale 72 is read against the index 73 which, if not offset, would be located on the gun target line along which the center of the dial 66 travels in range when the carriage 64 is displaced. The offsetting of the index is made to provide a window 74 in the carriage 64 and this window is inscribed with a reference line 75.

A casing 76 fixed to the frame 15 and positioned underneath the carriage 64 contains a heptagonal ruler 77 (similar to the ruler 24 of Fig. 3) provided with seven range scales 78 applicable to the seven zones and representing portions of the gun target line. The range scales are offset so that while the reading may be conveniently made by employing the reference line 75 and a fixed index scale 79 the range will represent the position of the center of the dial 66. The center of the dial is positioned on the gun target line in accordance with the uncorrected range of the "setforward" point, which data is available as it formed the basis for laying the gun in elevation. An externally positioned handwheel 80 is provided for turning the ruler and a latch 81 serves to hold the ruler against rotation.

A spotting arm 82 pivotally mounted in the center of the dial is provided with a range scale 83 and carries a slide 84 having an index 85 for reading the scale 83 and pivotally carrying a marker or targ 86 (Fig. 9). The targ is an angled member whose vertical wall 87 is adapted to be engaged by the fiducial edge 29a of the casing 28 and whose upper horizontal finger 88 is adapted to overlie the chart and has a crossline reading index 89. A latch 90 is mounted on the carriage 64 and serves to hold the spotting arm against rotation.

The dial assembly when set to a range is employed to establish the range setting of the casing 28 in the following manner. The targ 86 is positioned with its index 89 directly over the center of the dial. The casing 28 is then moved to the right by moving the gun arm 5 until it is brought up against the wall 87 of the targ and it is moved longitudinally until its reference line 63 is underneath the index 89 of the targ. The reference line 62 is also under the index 89 of the targ and if the range on the chart as indicated by the reference line 62 does not correspond to the range setting of the dial as indicated by reference line 75 and range scale 78 then the clutch is disengaged and the chart moved manually until the range settings of the chart and dial are in agreement.

The orientation of the dial is illustrated diagrammatically in Figs. 16 and 17. In Fig. 16 in which all references are to the south, the dial is represented as being superimposed on the target with its 12 o'clock mark set at the azimuth 240° of the course of the target as read on the inner azimuth scale 71. The gun target line GT by reference to the outer scale 72 shows an azimuth of 200°. The data relating to the azimuth of the target and the course of the target is available from plotted data at the fire control station.

Fig. 17 represents the application of the diagram to the spotting board in which GT is the center line of the board represented by the range scale 78 (Fig. 1) and since this line is fixed on the board all references are now to it. Inasmuch as the azimuth scales 71 and 72 are zeroed 180 degrees apart, setting off the azimuth of the target on the outer scale 72 by reading at the index 73 is equivalent to setting off the back azimuth of the gun target line and the desired orientation of the course with reference to the gun target is conveniently obtained.

In order to check the adjustment of the board, the dial is set at a given range and the targ is placed at the center of the dial. The casing is then moved against the targ (Fig. 1) and its chart is adjusted if necessary so that its range reading corresponds to the range setting of the dial. The targ which is over the position of the target should indicate zero range correction and the gun arm should indicate zero lateral deflection correction.

When a shot is fired at the target the aerial observer notes the burst point or the splash and designates its location in terms of reference to the target and target course. For example, he transmits a message of this character "450 yards, 2:30 o'clock." The operator of the spotting board having oriented the dial, positioned the dial and the chart at the proper range and adjusted the direction arm to the proper zone, now moves the spotting arm 82 to 2:30 o'clock on the dial (see Fig. 1) and sets the targ 86 at the range of 450 yards as shown on the scale 83. The index 89 of the targ now represents the point of splash with the target represented at the center of the dial.

The gun arm 5 is then brought up against the targ as described for checking the adjustment (Fig. 4) and the index 89 of the targ will indicate the percentage range correction by reference to the diverging lines 32 of the chart and the relation as "over" or "short" by reference to the appropriate range line 31. The reference mark 23 on the gun arm will indicate on the scale 25 the deflection in degrees of azimuth. These corrections in terms of reference numbers are applied on other instruments for determining firing data.

In certain types of long range firing it is desirable to apply the range component of the deviation directly to the range at which the shot was fired, thus obtaining the range at which the shot should have been fired in order to have hit the target. For example, if a shot fired at a range of 35,000 yards falls 320 yards short of the target, the corrected range for the next shot will be 35,320.

In Figs. 10 to 12 there is shown a device for obtaining corrected range by direct reading and this device may be substituted for the range percentage convertor in the casing 28. It consists of a casing 91 similar to the casing 28 and contains a sheet 92 arranged lengthwise of the casing and bearing a range corrector scale 93 covering the entire field of fire and increasing in value to the left and decreasing to the right. The sheet is mounted on take-up rollers 94—94 an idler roller 95 and a drive roller 96.

A spur gear 97 meshing with the rack 59 on the gun arm actuates the drive shaft 98 including a clutch. The drive shaft is connected to the drive roller by spur gearing 99 and sprocket drive chain 100.

A spring tension device for the take-up rollers 94—94 is contained in a cylinder 101 extending lengthwise of the casing. A bevel gear 102 fixed on one end of the cylinder meshes with a gear 103 on one take-up roller while a shaft 104 journaled in the cylinder has a bevel gear 105 meshing with a gear 106 on the other take-up roller. A coil spring 107 embraces the shaft and has one end attached to the shaft and its other end to the cylinder. A gear ratio of 4 to 1 or greater permits the use of a short and strong spring.

The method of operation is the same as when using the percentage convertor. Fig. 12 illustrates somewhat diagrammatically the relation of the range connector scale to the spotting arm 82ª and the range scale 78ª. The target is at a range of 35,000 yards, the burst is at the index 89ª and is short of the target by 320 yards. The scale 93 therefore gives a corrected range reading of 35,000 plus 320 or 35,320 which is to be used on the next shot.

I claim.

1. In a spotting board, a frame including front and rear casings, guide rods connecting the casings, a member in the front casing rotatable to present different deflection scales for successive range zones, a range casing fixed on the frame between the guide rods, a member in said casing rotatable to present different range scales for successive range zones and representing a gun target line, a carriage slidable on the guide rods, and having a reference line readable against the range scales. a clock dial rotatable on the carriage. a rotatable ring encircling the dial and having azimuth scales on its inner and outer margins, said scales zeroed at different points, an index on the carriage for reading the outer scale, a spotting arm pivoted at the center of the dial, a range scale on the arm, a targ having an index and slidable on the arm according to range, a gun arm movable over the front and rear casings and having a reference line for reading the deflection scales in the front casing, a director arm having one end pivoted to the front casing, a scale in the rear casing against which the outer end of the director arm is readable, said scale denoting successive range zones, lazy tongs connecting the gun arm and director arm and having corresponding ends slidably associated with said arms, a pivot for the lazy tongs adjustable according to successive range zones, a percentage range casing slidable on the gun arm, a chart in said casing having range lines and diverging lines showing percentages of range and readable against the index of the targ, means for displacing the chart on movement of its casing on the gun arm, and a clutch in said preceding means.

2. In a spotting board, a frame, a member extending longitudinally of the frame and rotatable to present different range scales for successive zones, said member representing a gun target line, a rotatably mounted clock dial having its center on the gun target line and movable along said line to range positions, means for orienting the clock dial, a spotting arm pivoted at the center of the dial, a range scale on the arm, a targ slidable on the arm according to range, a gun arm extending longitudinally of the frame and movable transversely thereof, a director arm having one end pivoted to the frame, means for adustably positioning the director arm according to successive range zones, lazy tongs connecting the gun and director arms and having a pivot adjustable to successive range zones, a chart carried by the gun arm, said chart including lines denoting corrections to range and readable against the targ, and means for adjusting the chart according to range.

3. In a spotting board, a frame, a member extending longitudinally of the frame and rotatable to present different range scales for successive zones, said member representing a gun target line, a rotatably mounted clock dial having its center on the gun target line and movable along said line to range positions, means for orienting the clock dial, a spotting arm pivoted at the center of the dial, a range scale on the arm, a targ slidable on the arm according to range, a gun arm extending longitudinally of the frame and movable transversely thereof, a director arm having one end pivoted to the frame, means for adjustably positioning the director arm according to successive range zones, lazy tongs connecting the gun and director arms and having a pivot adjustable to successive range zones, a member extending transversely of the frame and rotatable to present different deflection scales for successive range zones, and a reference arm on the gun arm for reading said scales.

4. In a spotting board having a center line representing a gun target line, a clock dial movable along the center line, a set of range scales for successive range zones disposed along the center line and from which the range position of the clock dial is determined, means for orienting the clock dial, a gun arm movable transversely of the frame and describing an arc about a center that is off the board, means for adjusting the gun arm for each of the successive range zones, a chart movably mounted longitudinally of the gun arm and having a range correction scale, means for displacing the chart as it is moved longitudinally of the gun arm, and a set of deflection scales corresponding to the set of range scales for successive range zones, said deflection scales disposed transversely of the center line and readable by reference to the gun arm.

5. In a spotting board having a center line representing a gun target line, a clock dial movable along the center line, a set of range scales for successive range zones disposed along the center line and from which the range position of the clock dial is determined, means for orienting the clock dial, a gun arm movable transversely of the frame and describing an arc about a center that is off the board, means for adjusting the gun arm for each of the successive range zones, a chart movably mounted longitudinally of the gun arm and having a range correction scale and means for displacing the chart as it is moved longitudinally of the gun arm.

6. In a spotting board having a center line representing a gun target line, a clock dial movable along the center line, a set of range scales for successive range zones disposed along the center line and from which the range position of the clock dial is determined, means for orienting the clock dial, a gun arm movable transversely of the frame and describing an arc about a center that is off the board, means for adjusting the gun arm for each of the successive range zones, a chart movably mounted longitudinally of the gun arm and having a range correction scale, and a set of deflection scales corresponding to the set of range scales for successive range zones, said deflection scales disposed transversely of the center line and readable by reference to the gun arm.

7. In a spotting board having a center line representing a gun target line, a clock dial movable along the center line, a set of range scales for successive range zones disposed along the center line and from which the range position of the clock dial is determined, means for orienting the clock dial, a gun arm movable transversely of the frame and describing an arc about a center that is off of the board, means for adjusting the gun arm center for each of the successive range zones, and a chart movably mounted longitudinally of the gun arm and having a range correction scale.

8. In a spotting board having a center line representing a gun target line, a clock dial movable along the center line, a set of range scales for successive range zones disposed along the center line and from which the range position of the clock dial is determined, means for orienting the clock dial, a gun arm movable transversely of the frame and describing an arc about a center that is off of the board, means for adjusting the gun arm for each of the successive range zones, and a set of deflection scales corresponding to the set of range scales for successive zones, said deflection scales disposed transversely of the center line and readable by reference to the gun arm.

9. In a spotting board having a center line representing a gun target line, a rotatably mounted clock dial movable along the center line according to range, the center of said dial representing position of a target on a course directed at 12 o'clock of the clock dial, a spotting arm pivoted at the center of the dial, a range scale on the arm, a targ slidable on the arm according to range, a rotatable ring encircling the dial and having azimuth scales on its inner and outer margins, said scales zeroed at different points.

10. In a spotting board having a center line representing a gun target line, a rotatably mounted clock dial movable along the center line according to range, the center of said dial representing position of a target on a course directed at 12 o'clock of the clock dial, a rotatable ring encircling the dial and having azimuth scales on its inner and outer margins, said scales zeroed at different points.

11. In a spotting board, a frame, a director arm pivoted to the frame, a gun arm movable transversely of the frame and describing an arc about a center that is off of the board, lazy tongs connecting the gun arm and director arm and having corresponding ends slidably associated with said arms, a pivot for the lazy tongs adjustable for different range zones, and means for fixing the director arm in positions of adjustment for different range zones.

12. In a spotting board, a gun arm, a rack extending longitudinally of the arm, a casing slidable longitudinally of the arm, a pair of rollers in the casing, oppositely acting coil springs for the rollers, sprockets on the rollers, a chain on the sprockets, a range chart wound on the rollers, a driving roller for moving the chart, and gearing including a clutch between the driving roller and the rack of the gun arm.

13. In a spotting board, a gun arm, a rack extending longitudinally of the gun arm, a casing slidable longitudinally of the gun arm, rollers in the casing, a chart wound on the rollers, a driving roller for moving the chart, and gearing between the driving roller and the rack of the gun arm.

14. In a spotting board having a center line representing a gun target line, a clock dial movable along the gun target line, means from which the range position of the clock dial is determined, a gun arm movable transversely of the board, a displaceable range chart movable longitudinally of the gun arm, and means for establishing the range position of the chart by reference to the center of the clock dial.

15. In a spotting board, a frame, a director arm pivoted to the frame, a gun arm movable transversely of the frame, a pair of lazy tongs connecting the director arm and gun arm and having corresponding ends slidably associated with the arms, and a pivot for the tongs displaced from the longitudinal center of the tongs whereby the gun arm is movable out of parallelism with respect to the director arm.

ROBERT F. HAGGERTY.